United States Patent
Andrejcak et al.

(10) Patent No.: US 6,447,906 B1
(45) Date of Patent: Sep. 10, 2002

(54) FIREPLACE ARTICLES COMPRISING NON-WHITE INORGANIC FIBERS AND METHOD OF PREPARATION

(75) Inventors: Michael J. Andrejcak, Niagara Falls; Bruce K. Zoitos, Buffalo, both of NY (US)

(73) Assignee: Unifrax Corporation, Niagara Falls, NY (US)

( * ) Notice: Subject to any disclaimer, the term of this patent is extended or adjusted under 35 U.S.C. 154(b) by 0 days.

(21) Appl. No.: 09/451,752

(22) Filed: Nov. 30, 1999

(51) Int. Cl.[7] .............................. D02G 3/00; B28D 1/26; C10L 11/00
(52) U.S. Cl. ........................ 428/389; 428/367; 428/368; 428/15; 428/18; 264/87; 264/86; 44/535; 44/558; 44/559; 431/125
(58) Field of Search ............................ 428/15, 18, 367, 428/368, 375, 389, 392; 44/535, 543, 558, 559; 431/125; 126/512; 264/87, 86

(56) References Cited

U.S. PATENT DOCUMENTS

| | | | |
|---|---|---|---|
| 3,617,162 A | * 11/1971 | June et al. .......................... 8/8 |
| 3,653,952 A | 4/1972 | Gagliardi |
| 3,847,655 A | 11/1974 | Crimmel |
| 4,009,314 A | 2/1977 | Allewelt |
| 4,047,965 A | 9/1977 | Karst |
| 4,076,490 A | * 2/1978 | Hilker .......................... 431/17 |
| 4,137,209 A | 1/1979 | Wong |
| 4,141,948 A | 2/1979 | Laskow |
| 4,162,348 A | 7/1979 | Juzu |
| 4,179,269 A | 12/1979 | Yates |
| 4,291,095 A | 9/1981 | Chase |
| 4,312,911 A | 1/1982 | Smith |
| 4,379,111 A | 4/1983 | Smith |
| 4,382,104 A | 5/1983 | Smith |
| 4,801,562 A | 1/1989 | Sowman |
| 4,838,240 A | 6/1989 | Rieger |
| 4,877,417 A | 10/1989 | Crace |
| 4,929,578 A | 5/1990 | Sowman |
| 5,026,579 A | 6/1991 | Thow |
| 5,066,774 A | 11/1991 | Geibel |
| 5,074,886 A | 12/1991 | Fussmann |
| 5,092,313 A | 3/1992 | Blackburn |
| 5,102,728 A | 4/1992 | Gay |
| 5,104,598 A | 4/1992 | Dolle |
| 5,118,539 A | 6/1992 | Sebby |
| 5,262,235 A | 11/1993 | Heaney, III |
| 5,271,888 A | 12/1993 | Sinsley |
| 5,284,686 A | 2/1994 | Thow |
| 5,542,976 A | 8/1996 | Martin |
| 5,612,266 A | 3/1997 | Delvaux |
| 5,655,513 A | 8/1997 | Whitfield |
| 5,688,568 A | 11/1997 | Wolf |
| 5,786,045 A | * 7/1998 | Gerth et al. ................... 428/15 |
| 5,800,746 A | 9/1998 | Jones |
| 5,800,875 A | 9/1998 | Hussong |
| 5,839,427 A | * 11/1998 | Shorts ......................... 126/512 |
| 5,874,375 A | 2/1999 | Zoitos |

\* cited by examiner

*Primary Examiner*—Cynthia H. Kelly
*Assistant Examiner*—J. M. Gray
(74) *Attorney, Agent, or Firm*—Renner, Kenner, Greive, Bobak, Taylor & Weber

(57) ABSTRACT

The present invention provides molded fireplace articles comprising a plurality of non-white inorganic fibers that are substantially uniformly coated with a colored metal oxide. The present invention further provides a method of manufacturing molded fireplace articles comprising: providing a plurality of non-white inorganic fibers; mixing the fibers with a binder and a liquid to form a slurry; pouring the slurry into a mold having a desired shape; and forming the slurry into a shaped article. A method of preparing non-white inorganic fibers is also provided, the method comprising the steps of: providing a colorant solution formed by dispersing or dissolving a metal compound into a carrier liquid, providing an inorganic fiber, applying the colorant solution to the inorganic fiber to form a colorant coated fiber, and heating the colorant coated fiber to a temperature sufficient to decompose the metal compound to a non-white metal oxide that is substantially uniformly coated on said fibers.

27 Claims, No Drawings

FIREPLACE ARTICLES COMPRISING NON-WHITE INORGANIC FIBERS AND METHOD OF PREPARATION

TECHNICAL FIELD OF THE INVENTION

The present invention is directed to molded articles comprising a plurality of high temperature resistant non-white inorganic fibers for use in the artificial fireplace products industry, and methods of manufacturing the molded fireplace articles.

BACKGROUND OF THE INVENTION

Synthetic fireplace (hearth) products is a rapidly growing area of industry. Propane and natural gas-burning fireplaces and stoves are becoming increasingly popular with consumers who wish to avoid the high maintenance of wood-burners. Artificial, synthetic logs, coals and embers are utilized to replicate the appearance of burning wood. These products must be made of refractory material which can be molded and colored to resemble actual wood.

The prior art reveals several attempts to produce non-combustible artificial fireplace articles, such as fireplace logs, that simulate the natural appearance of wood or bark. Non-combustible synthetic fire-logs have been devised, for use as a decorative substitute for natural wood-logs in an oil-or gas-burning fireplace or stove. In this kind of burning equipment, wood is not required as a combustible and must even be avoided. However, it is often required that such an oil-or gas-burning fireplace or stove looks like its wood-burning equivalents, thereby making it necessary to use "synthetic logs".

The hearth-products industry uses fibers, such as refractory ceramic fibers and the like, to make artificial firelogs, coals, embers and simulated brick fireplace liners. One type of ceramic fiber that is traditionally used to produce fireplace products is the vitreous alumino-silicate. Alumino-silicate fibers are produced by melting a combination of alumina and silica in approximately equal proportions or by melting kaolin clay in an electric resistance furnace. The molten mixture may be formed into fiber in a variety of different ways. Once formed, the fibers may be molded into a desired shape.

Ceramic fibers are white or near-white in color. In order to impart a realistic appearance to the artificial fireplace products made from ceramic fibers, the exterior surface of the article is traditionally painted to produce a natural-looking surface. For example, a synthetic fireplace log may be painted brown to simulate bark, light tan to simulate end-grain or a split-log surface or black to simulate char. During the production, handling, shipping, installation or use of these products, the painted surface may become chipped, eroded, or abraded sufficiently to remove the paint from a portion of the exterior surface of the product. In such cases, the white color of the fibers comprising the article become visible in the chip or scratch and, thus, the aesthetic quality of the product is substantially degraded or lost due to the unnatural appearance of the flawed area.

An example of such a non-combustible, decorative fire-log intended to be used in combination with combustible synthetic fire-logs is disclosed in U.S. Pat. No. 5,118,539 issued to D. Sebby et al. Usually, such non-combustible fire-logs are made of cement and refractory aggregates or ceramic fibers.

U.S. Pat. No. 5,271,888 reports a method to produce a colored log by vacuum forming a mixture containing ceramic fibers and iron chromite that are for use in natural gas, propane and wood-burning fireplaces and stoves which are both fully-vented and non-vented depending upon the particular design of the heat generating equipment.

In the process disclosed in U.S. Pat. No. 5,271,888, the log is produced by vacuum forming using, as starting material, a mixture of ceramic fibers, such as aluminosilicate fibers, and chromite dispersed into water, to which is added a flocculating composition including starch possessing a negative charge to facilitate solid formation, and a colloidal silica/sol possessing a positive charge to improve the adherence of the fibers to each other and thus to improve the handling properties of the resulting molded log. The chromite component and the other mineral pigments that can be added to the composition to produce a log that has a bark-like exterior surface and a dark color to simulate a natural looking arrangement of real wood-logs in an oil- or gas-burning environment.

U.S. Pat. No. 5,542,976 relates to the production of imitation fireplace objects by molding a mixture of cement, amorphous mineral silicate, and fiber. Colorants, such as manganese dioxide, may be added to the molding mixture.

A mineral foam is molded into a synthetic firelog in a method disclosed in U.S. Pat. No. 5,612,266. Optionally, one or more pigments may by added to the foam to impart color to the log.

U.S. Pat. No. 4,379,111 to Smith et al discloses a method for producing chromium oxide coated refractory ceramic fibers. According to the reference, the fibers can be uniformly coated by spraying a solution of chromium ion on the ceramic fibers during the fiberization step and prior to initial cooling to ambient temperature. The coated fibers can be incorporated into mats and blankets having high temperature resistance and low shrinkage.

In each prior art reference described above, the range and quality of color is limited. Because each fiber in the fireplace log is not individually colored, color throughout the entire molded object is not achieved.

Non-white fibers, of a color which simulates the natural color of the material the product represents, would allow the production of a fireplace article which is colored throughout the bulk of the product, rather than just on the exterior surfaces. Fireplace articles comprising combinations of different colored fibers would allow a wider range of color shading and color patterns. Surface aberrations and flaws which might occur during production, handling, shipping, installation or use would not lead to a large degradation in the aesthetic appearance or quality of the artificial fireplace product.

For this reason, development of fireplace articles comprising individually colored inorganic fibers is considered desirable in the art to produce a more durable and realistic end product.

SUMMARY OF THE INVENTION

It is, therefore, an object of present invention to provide molded fireplace articles that are colored throughout.

It is another object of the present invention to provide an artificial fireplace article that simulates the aesthetic appearance of natural wood, bark or brick.

It is another object of the present invention to provide molded fireplace articles that are colored throughout, and that simulate the aesthetic appearance of fireplace logs, bricks, coals, embers, liners and inserts.

It is another object of the present invention to provide molded fireplace articles that are colored throughout, so that the aesthetic appearance is not significantly degraded by exterior surface aberrations, such as cracks, chips and scratches.

It is another object of the present invention to provide molded fireplace articles that are high temperature resistant.

It is another object of the present invention to provide fireplace articles that resist shrinkage.

The foregoing objects, together with the advantages thereof over the known art relating to artificial fireplace articles and methods of manufacturing artificial fireplace articles, which shall become apparent from the specification which follows, are accomplished by the invention as hereinafter described and claimed.

The present invention, therefore, provides a molded fireplace article comprising a plurality of non-white inorganic fibers, and characterized in that the non-white inorganic fibers are substantially uniformly coated with a colored metal oxide.

The present invention further provides a method for manufacturing a molded articles comprising: providing a plurality of non-white inorganic fibers, mixing the fibers with a binder and a liquid to form a slurry, and forming the slurry into a shaped article.

In one preferred embodiment of the present invention, the non-white inorganic fibers comprising the molded fireplace articles are prepared by the steps comprising: providing a colorant solution formed by dispersing or dissolving a metal compound into a carrier liquid, providing an inorganic fiber, applying the colorant solution to the inorganic fiber to form a colorant coated fiber, and heating the colorant coated fiber to a temperature sufficient to decompose the metal compound to a non-white metal oxide that is uniformly deposited on the fibers.

The present invention also provides a method of preparing non-white inorganic fibers comprising the steps of: providing a colorant solution formed by dispersing or dissolving a metal compound into a carrier liquid, providing an inorganic fiber, applying the colorant solution to the inorganic fiber to form a colorant coated fiber, and heating the colorant coated fiber to a temperature sufficient to decompose the metal compound to a non-white metal oxide that is substantially uniformly coated on said fibers.

DETAILED DESCRIPTION OF THE INVENTION

The present invention is directed to artificial molded fireplace articles that are prepared from a plurality of non-white inorganic fibers. The molded articles of the present invention are colored throughout and, therefore, will not suffer serious degradation of aesthetic appearance if the exterior surface is abraded, cracked, chipped or scratched.

The molded fireplace articles of the present invention comprise a plurality of non-white inorganic fibers and are further characterized in that the non-white inorganic fibers are substantially uniformly coated with a colored metal oxide. Inorganic fibers that are particularly useful in the manufacture of the artificial fireplace objects are selected from ceramic fibers, glass fibers, stonewool fibers, glass wool fibers, mineral wool fibers, and high temperature resistant soluble inorganic fibers, such as alkaline earth silicate fibers.

Useful ceramic fibers include, but are not limited to, mullite, alumina, zirconia, titania, chromium oxide, silicon nitride, silicon carbide, titanium nitride, titanium carbide, silica, ceria, and alumino-silicate fibers. Alumino-silicate fibers are preferably used to prepare the artificial fireplace articles of the present invention. Suitable alumino-silicate fibers are commercially available from Unifrax Corporation, Niagara Falls, N.Y., under the trademark FIBERFRAX®.

Suitable high temperature resistant soluble inorganic fibers include, but are not limited to, magnesium-silica fibers disclosed in U.S. Pat. No. 5,874,375, and which are commercially available from Unifrax Corporation, Niagara Falls, N.Y., under the trademark ISOFRAX™, calcium-magnesium-silica fibers commercially available from Unifrax Corporation, Niagara Falls, N.Y., under the trademark INSULFRAX™, and calcium-magnesium-silica fibers commercially available from The Morgan Crucible Company under the trademark SUPERWOOL™.

The non-white (colored) inorganic fibers employed in the present invention are prepared by heating a colorant compound, comprising a metal cation and an anion and having a thermal decomposition temperature less than the fiber devitrification temperature, to a temperature equal to or above the thermal decomposition temperature and below the fiber devitrification temperature.

A suitable colorant material may be selected from the family of metal compounds having a metal cation and an anion, and being capable of undergoing heat or thermal decomposition. It is necessary that one of the products of this decomposition be a colored metal oxide which comprises the corresponding metal cation of the colorant material. The colored metal oxide coating is preferably selected from the group consisting of chromium oxide, iron oxide, vanadium oxide, nickel oxide, cobalt oxide, manganese oxide, and copper oxide.

The metal cation in the colorant compound is preferably selected from a cation of at least one metal selected from chromium, iron, vanadium, nickel, cobalt, manganese, copper, and the like, though any other metal cation may be used which imparts a color when combined with oxygen. The anion present in the colorant compound is preferably selected from nitrate, formate, acetate, citrate, lactate, tartrate, oxalate, and the like, though any other anion may be used so that the colorant material decomposes below the devitrification temperature of the fiber to be coated. For example, the devitrification temperature of alumino-silicate fibers is about 1800° F. (980° C.). In one preferred embodiment, the colorant compound used to color the inorganic fibers is iron acetate.

Painting techniques have been traditionally used to impart a natural wood or bark color to the exterior surface of artificial fireplace articles. Paints are a dispersion of colorant suspended in an oil or latex base. Paints are susceptible to thermal damage and chipping or peeling. The method of the present invention differs from conventional painting techniques, in that the coating is dispersed uniformly over the surface of the inorganic fibers by deposition and a chemical/thermal curing step in which the colorant compound decomposes, leaving the inorganic fibers substantially uniformly coated with a metal oxide.

The inorganic fibers may be produced by any of several known fiberization techniques, including melt-blowing, melt-spinning, melt-drawing, viscous spinning, and the like. Melt-blown inorganic fibers are produced by melting appropriate materials, pouring them in a molten stream, and subjecting the stream to a high-pressure air jet, thus atomizing the stream and elongating the droplets into fibers.

The fibers are coated at an appropriate point during the production of the fiber, as a colorant solution is applied. In one embodiment, coating of the fiber is preferably accomplished by introducing the colorant solution into the blowing air at or near the point of fiberization, thus coating the fiber as it is formed during the fiberization process.

The colorant solution comprises a suitable colorant compound dispersed or dissolved in an appropriate carrier liquid. Suitable carrier liquids include, but are not limited to, water and the like. The liquid carrier should have relatively low viscosity and should have the capability to wet the fiber thoroughly. Additives may also be used to alter the carrier surface tension, to enhance film formation, to enhance the metal compound solubility or to enhance surface charge of the inorganic fiber, thus, increasing the adherence of the metal oxide coating on the surface of the fibers. Suitable additives that may be included in the colorant solution include, but are not limited to, chelating agents, such as ethylenediamine tetracetic acid (EDTA), surfactants, acids, such as acetic acid, and bases, such as ammonium hydroxide.

After the colorant solution is applied to the fiber, the fiber/colorant mixture is then heated to a temperature sufficient to decompose the colorant material and deposit a colored metal oxide coating on the fiber.

The metal oxide coating is dispersed substantially uniformly over the fiber surface, and adheres to the fiber surface, both before and after curing. The adherence of the metal oxide coating to the fiber is a function of the chemical/thermal curing step in which the applied colorant compound decomposes.

In a preferred embodiment, the colorant solution is applied to a melt-blown inorganic fiber at the point of fiberization, in the following manner: a solution of iron acetate is introduced into the air stream of a fiber blowing nozzle. In this way, the iron acetate solution is distributed evenly over the fiber as it is fiberized from the melt. The fiber is collected and conveyed to an oven operating at about 400–700° F., where the acetate group is decomposed into $H_2O$ and $CO_2$, leaving $Fe_2O_3$ (which has a brown color) on the fiber surface.

In another embodiment, a colorant solution may be used to coat melt-spun inorganic fibers, melt-drawn fibers, fibers produced by viscous spinning or fibers produced by any other fiberization technique. In one embodiment, the colorant solution is sprayed onto a melt-spun fiber at the point of fiberization, that is, as it is being spun. In this embodiment, the colorant solution may be sprayed onto the spinning wheel apparatus during the fiber spinning process.

Artificial fireplace articles fibers are manufactured by providing a plurality of non-white inorganic fibers having a metal oxide coating thereon, as described hereinabove. The plurality of non-white inorganic fibers are mixed with a suitable binder and a liquid to form a slurry. Suitable binding agents include, but are not limited to, colloidal silica, starch, and mixtures thereof. The slurry is poured into a suitable mold having a desired shape. The slurry is molded into a shaped article, preferably by known vacuum casting techniques. The vacuum casting process employed in the present invention produces a rigid or semi-rigid article by pouring a slurry of ceramic fibers, binder and liquid carrier into a permeable mold, and hastening the removal of the liquid from the mold by the application of a vacuum to the outer surfaces of the mold. Generally, the liquid in the slurry is removed by vacuum through a mesh screen. The resulting article is removed from the mold and dried.

Molded fireplace articles produced by the methods of the present invention are colored throughout, simulate the natural appearance of wood or bark, and are colorfast at the use temperatures. The fireplace articles also exhibit low thermal shrinkage at 1700° F., are tolerant of thermal cycling, and resist cracking.

SPECIFIC EMBODIMENTS OF THE INVENTION

Example Nos. 1–4 are melt-blown alumino-silicate inorganic fibers that were produced using a research-scale Submerged Electrode Furnace (SEF), by melting the alumina and silica starting materials, pouring the starting materials in a molten stream, and subjecting the stream to a high-pressure air jet, thus atomizing the stream and elongating the droplets into fibers. An aqueous colorant solution was applied to the alumino-silicate fibers by spraying it into the fiberization air jet at a rate of 1.5 gallons per hour (GPH). The resulting fibers were heated to 932° F. (500° C.). Table 1, below, summarizes the results for Example Nos. 1–4, in which manganese acetate and iron nitrate were used as the colorant compounds. Three different concentration levels of manganese acetate colorant solution were used, namely about 10 weight percent, about 20 weight percent, and about 50 weight percent manganese acetate. In each example, a non-white inorganic fiber was obtained, with the color ranging from light brown to dark brown to black. A 30% solution of iron nitrate was used in Example No. 4, and rusty-tan colored fibers were obtained.

TABLE 1

| COLORANT SOLUTION ADDED DURING FIBERIZATION | | | | |
|---|---|---|---|---|
| EXAMPLE # | 1 | 2 | 3 | 4 |
| Metal Compound | Manganese Acetate | Manganese Acetate | Manganese Acetate | Iron Nitrate |
| Solution Concentration (wt %) | 10% | 20% | 50% | 30% |
| Solution Addition Rate (GPH) | 1.5 | 1.5 | 1.5 | 1.5 |
| Firing Temperature (° F.) | 932 | 932 | 932 | 932 |
| Final Fiber Color | light brown | brown | black | rusty-tan |

As shown in Table 1, applying a colorant solution to the fiber in the above manner achieved a non-white inorganic fiber with a color of light brown when a 10 weight percent manganese acetate solution was used, darker brown to black when a 20% to 50% solution was used, and a rusty tan color when a 30% solution of iron nitrate was applied to the fiber.

Additional examples were prepared using a furnace and in-line processing oven. Results of this work, Example Nos. 5–8, are summarized in Table 2. Aqueous manganese acetate solutions of two intermediate concentration levels, about 30%, and about 40% were added to the fiberization air jet. The rate of addition was varied from about 10 GPH to about 15 GPH, and the melt pour rate was maintained at about 1000 lbs/hr. The resulting fibers were heated to 572° F. (300° C.). In each example, a brown fiber was produced.

TABLE 2

COLORANT SOLUTION ADDED DURING FIBERIZATION

| EXAMPLE # | 5 | 6 | 7 | 8 |
|---|---|---|---|---|
| Metal Compound | Manganese Acetate | Manganese Acetate | Manganese Acetate | Manganese Acetate |
| Solution Concentration (wt %) | 40% | 40% | 30% | 30% |
| Solution Addition Rate (GPH) | 10 | 15 | 10 | 15 |
| Firing Temperature (° F.) | 572 | 572 | 572 | 572 |
| Final Fiber Color | brown | brown | brown | brown |

Table 2 provides further evidence that applying a colorant solution to a fiber during the process of fiberization results in a non-white fiber. Fibers resulting from the above examples were tested for colorfastness in water, and it was found that the coating was sufficiently adherent to remain intact in spite of vigorous agitation.

Using known vacuum casting techniques, articles were produced from non-white inorganic fibers prepared as described in Example Nos. 1–8, and were found to exhibit acceptable thermal shrinkage (less than about 4%) when tested at 1700° F. for 72 hours. Surprisingly, no deleterious fluxing in the processing of the component materials with the colorant was observed.

Table 3 summarizes Example Nos. 9–14, in which colorant solution was applied to a previously produced fiber, in this case, a 3"×5" piece of alumino-silicate inorganic fiber blanket sold by Unifrax Corporation (Niagara Falls, N.Y.) under the trademark DURABLANKET-S®. Enough colorant solution was added to give about 2 wt % metal oxide content in the blanket. The fiber blanket was then heated to 2300° F. for 24 hours.

hearth products industry prepared from a plurality of non-white inorganic fibers have a realistic, durable color throughout the articles. Articles which may be thus produced include, but are not limited to, artificial logs, coal, embers, bricks, and brick fireplace liners. The fireplace articles produced according to the present invention survives the performance requirements of hearth products such as artificial fireplace logs. The logs have a color that is consistent with and simulates the natural color of wood and bark, the logs exhibit high temperature resistance, and the logs shrink less than about 4% after exposure to use temperatures of at least 1700° F.

The methods of the present invention can be used to manufacture fireplace articles, such as artificial fireplace logs, artificial coals or embers, simulated fireplace bricks, and simulated brick fireplace inserts or liners.

Based upon the foregoing description, it should now be apparent that the described fireplace articles and methods of manufacture will carry out the objects set forth above. It is therefore to be understood, that variations can be made to the specific steps and materials described above without departing from the spirit of the invention as herein disclosed and described. Thus, the scope of the invention shall include all modifications and variations that fall within the scope of the claims.

TABLE 3

COLORANT SOLUTION ADDED TO PRE-FORMED FIBER

| EXAMPLE # | 9 | 10 | 11 | 12 | 13 | 14 |
|---|---|---|---|---|---|---|
| Metal Compound | Cobalt Acetate | Manganese Acetate | Nickel Acetate | Vanadium Acetate | Copper Acetate | Iron Acetate |
| alumino-silicate inorganic fiber blanket | DURABLANKET-S | DURABLANKET-S | DURABLANKET-S | DURABLANKET-S | DURABLANKET S | DURABLANKET S |
| % Metal Oxide | 2% | 2% | 2% | 2% | 2% | 2% |
| Firing Temp. (° F.) | 2300 | 2300 | 2300 | 2300 | 2300 | 2300 |
| Firing Time (hours) | 24 | 24 | 24 | 24 | 24 | 24 |
| Final Fiber Color | blue | brown | light blue | yellow brown | brown | brown |
| Appearance | high intensity | high intensity | low intensity | medium intensity | patchy | rusty brown |

As summarized in Table 3, non-white fibers were obtained by applying a colorant solution to preformed alumino-silicate fibers. When cobalt acetate was used, a blue color of high intensity was obtained. Using manganese acetate produced a brown color of high intensity. When nickel acetate was used, a light blue color of low intensity was obtained. A yellow-brown color of medium intensity was produced when a solution of vanadium acetate was used. Copper acetate produced a patchy brown colored fiber, and the use of iron nitrate resulted in a rusty brown colored fiber.

Thus, it should be evident that the objects of the present invention are very effectively met. Molded articles for the

We claim:

1. A molded fireplace article comprising a plurality of non-white inorganic fibers, wherein the non-white inorganic fibers are individually and substantially uniformly coated with a colored metal oxide.

2. The molded article of claim 1, wherein said non-white inorganic fibers comprise fibers selected from the group consisting of ceramic fibers, glass fibers, stone wool fibers, mineral wool fibers, glass wool fibers and high temperature resistant soluble inorganic fibers.

3. The molded article of claim 2, wherein the high temperature resistant soluble inorganic fibers are alkaline earth silicate fibers.

4. The molded article of claim 3, wherein the alkaline earth silicate fibers are selected from at least one of magnesia-silicate fibers, magnesia-zirconia-silicate fibers, and calcia-magnesia-silicate fibers.

5. The molded article of claim 2, wherein the ceramic fibers are selected from mullite, alumina, zirconia, titania, chromium oxide, silicon nitride, silicon carbide, titanium nitride, titanium carbide, silica, ceria, and alumino-silicate fibers.

6. The molded article of claim 5, wherein the ceramic fibers are alumino-silicate fibers.

7. The molded article of claim 1, wherein the colored metal oxide coating is selected from the group consisting of chromium oxide, iron oxide, vanadium oxide, nickel oxide, cobalt oxide, manganese oxide, and copper oxide.

8. The molded article of claim 7, wherein the metal oxide is prepared by heating a colorant compound, comprising a corresponding metal cation and an anion having a thermal decomposition temperature less than the fiber devitrification temperature, to a temperature equal to or above the thermal decomposition temperature of said colorant compound and below the fiber devitrification temperature.

9. The molded article of claim 8, wherein the metal cation is selected from a cation of a metal selected from the group consisting of chromium, iron, vanadium, nickel, cobalt, manganese, and copper.

10. The molded article of claim 8, wherein the anion is selected from the group consisting of nitrate, formate, acetate, citrate, lactate, tartrate, and oxalate.

11. The molded article of claim 1, wherein the article is selected from the group consisting of at least one artificial fireplace log, at least one artificial coal, at least one ember, at least one artificial fireplace brick, and a simulated brick fireplace insert or liner.

12. A method of manufacturing a molded fireplace article comprising:

providing a plurality of non-white inorganic fibers, wherein inorganic fibers are individually and substantially uniformly coated with a colored metal oxide;

mixing the individually and substantially uniformly coated fibers with a binder and a liquid to form a slurry;

pouring the slurry into a mold having a desired shape; and forming the slurry into a shaped article.

13. The method of claim 12, wherein the non-white inorganic fibers are a fibers selected from the group consisting of melt-blown fibers, melt-spun fibers, melt-drawn fibers, and viscous spun fibers.

14. The method of claim 12, wherein the non-white inorganic fibers are selected from the group consisting of ceramic fibers, glass fibers and high temperature resistant soluble inorganic fibers.

15. The method of claim 14, wherein the high temperature resistant soluble inorganic fibers are alkaline earth silicate fibers.

16. The method of claim 15, wherein the alkaline earth silicate fibers are selected from at least one of magnesia-silicate fibers, magnesia-zirconia-silicate fibers, and calcia-magnesia-silicate fibers.

17. The method of claim 12, wherein the ceramic fibers are selected from the group consisting of mullite, alumina, zirconia, titania, chromium oxide, silicon nitride, silicon carbide, titanium nitride, titanium carbide, silica, ceria, and alumino-silicate fibers.

18. The method of claim 12, wherein the non-white inorganic fibers are alumino-silicate fibers produced by melt-blowing.

19. The method of claim 12, wherein the non-white inorganic fibers are prepared by the steps of:

a) providing a colorant solution formed by dispersing or dissolving a metal compound into a carrier liquid, b) providing an inorganic fiber, c) applying the colorant solution to the inorganic fiber to form a colorant coated fiber, and d) heating the colorant coated fiber to a temperature sufficient to decompose the metal compound to a non-white metal oxide that is substantially uniformly coated on said fibers.

20. The method of claim 19, wherein the metal compound comprises a metal cation which imparts a color when combined with oxygen, and an anion such that the metal compound has a thermal decomposition temperature less than the devitrification temperature of the fiber.

21. The method of claim 20, wherein the metal cation is a cation of a metal selected from the group consisting of iron, vanadium, nickel, cobalt, manganese, and copper.

22. The method of claim 20, wherein the metal compound comprises an anion selected from the group consisting of nitrate, formate, acetate, citrate, lactate, tartrate, and oxalate.

23. The method of claim 19, wherein the colorant solution comprises ferric acetate dispersed in water.

24. The method of claim 19, comprising applying the colorant solution by spraying the fiber after the fiberizing step, and prior to the heating step.

25. The method of claim 19, including applying the colorant solution during the fiberizing step, and heating the colorant coated fiber to between about 400° F. and about 700° F.

26. The method of claim 19, wherein the colorant solution comprises an additive selected from the group consisting of chelating agents, surfactants, acids and bases.

27. The method of claim 12, wherein the article is in the shape at least one shape selected from the group consisting of a fireplace log, an arrangement of a plurality of fireplace logs, a coal, an arrangement of a plurality of coals, ember, arrangement of a plurality of embers, a fireplace brick, an arrangement of a plurality of fireplace bricks, and a brick fireplace liner.

* * * * *